(12) United States Patent
Zapadinski

(10) Patent No.: US 7,299,868 B2
(45) Date of Patent: Nov. 27, 2007

(54) METHOD AND SYSTEM FOR RECOVERY OF HYDROCARBONS FROM A HYDROCARBON-BEARING INFORMATION

(75) Inventor: Alexei Leonidovich Zapadinski, Moscow (RU)

(73) Assignee: Alexei Zapadinski, Moscow (RU)

( * ) Notice: Subject to any disclaimer, the term of this patent is extended or adjusted under 35 U.S.C. 154(b) by 428 days.

(21) Appl. No.: 10/471,831

(22) PCT Filed: Jan. 14, 2002

(86) PCT No.: PCT/RU02/00005

§ 371 (c)(1),
(2), (4) Date: Mar. 25, 2004

(87) PCT Pub. No.: WO02/075112

PCT Pub. Date: Sep. 26, 2002

(65) Prior Publication Data

US 2004/0154793 A1    Aug. 12, 2004

(30) Foreign Application Priority Data

Mar. 15, 2001  (RU) ............................... 2001106911
Oct. 8, 2001   (RU) ............................... 2001127126

(51) Int. Cl.
  *E21B 36/00*  (2006.01)
  *E21B 43/16*  (2006.01)
  *E21B 43/24*  (2006.01)
  *E21B 43/20*  (2006.01)

(52) U.S. Cl. .................... 166/266; 166/52; 166/57; 166/265; 166/267; 166/268; 166/272.1; 166/272.6; 166/302; 166/402

(58) Field of Classification Search ............ 166/52, 166/57, 90.1, 105.1, 265, 266, 267, 272.1, 166/272.6, 302, 303, 401, 406
See application file for complete search history.

(56) References Cited

U.S. PATENT DOCUMENTS

| 2,734,578 A | 2/1956 | Walter |
| 3,000,707 A * | 9/1961 | Barstow .................. 423/213.5 |
| 3,065,790 A | 11/1962 | Holm |
| 3,075,918 A | 1/1963 | Holm |

(Continued)

FOREIGN PATENT DOCUMENTS

CA    2018266 A1    12/1991

(Continued)

OTHER PUBLICATIONS

SU 1729300 A3—Description Of The Invention To The Patent—English Abstract.

(Continued)

*Primary Examiner*—George Suchfield
(74) *Attorney, Agent, or Firm*—Amin, Turocy & Calvin, LLP; James J. Bindseil

(57) ABSTRACT

A method and system for recovery of hydrocarbons from a hydrocarbon-bearing formation. A gaseous component of the produced hydrocarbon-containing fluid is separated from the fluid. The gaseous component is combusted with air in a power plant. Mixing and compressing of the gaseous component and air are realized to produce a flammable and pressurized gas-air mixture prior to combustion. An exhaust gas resulting from combustion is injected into the formation.

47 Claims, 3 Drawing Sheets

U.S. PATENT DOCUMENTS

| | | | | |
|---|---|---|---|---|
| 3,150,716 | A | * | 9/1964 | Strelzoff et al. ............ 166/268 |
| 3,232,885 | A | * | 2/1966 | Henke ......................... 252/372 |
| 3,342,259 | A | * | 9/1967 | Powell ..................... 166/272.1 |
| 3,605,885 | A | * | 9/1971 | Leeper .......................... 166/57 |
| 3,725,012 | A | * | 4/1973 | Gower .......................... 422/62 |
| 3,833,059 | A | | 9/1974 | Sisson et al. |
| 3,948,323 | A | | 4/1976 | Sperry et al. |
| 3,993,135 | A | | 11/1976 | Sperry et al. |
| 4,007,786 | A | | 2/1977 | Schlinger |
| 4,325,432 | A | * | 4/1982 | Henry ......................... 166/245 |
| 4,330,038 | A | | 5/1982 | Soukup et al. |
| 4,344,486 | A | * | 8/1982 | Parrish .................... 166/272.1 |
| 4,418,753 | A | | 12/1983 | Morel et al. |
| 4,465,136 | A | | 8/1984 | Troutman |
| 4,546,829 | A | * | 10/1985 | Martin et al. ................ 166/267 |
| 4,895,710 | A | * | 1/1990 | Hartmann et al. .......... 423/351 |
| 4,907,964 | A | | 3/1990 | Howarth et al. |
| 5,074,357 | A | | 12/1991 | Haines |
| 5,133,406 | A | * | 7/1992 | Puri ............................ 166/266 |
| 5,181,796 | A | * | 1/1993 | DeYoung ............... 405/128.35 |
| 5,388,645 | A | | 2/1995 | Puri et al. |
| 5,402,847 | A | * | 4/1995 | Wilson et al. .............. 166/402 |
| 5,626,191 | A | | 5/1997 | Greaves et al. |
| 5,769,165 | A | | 6/1998 | Bross et al. |
| 6,032,737 | A | | 3/2000 | Brady et al. |

FOREIGN PATENT DOCUMENTS

| | | |
|---|---|---|
| GB | 2117053 A | 10/1983 |
| GB | 2342390 A | 10/1998 |
| RU | 2061858 C1 | 6/1996 |
| RU | 2149312 C1 | 5/2000 |
| WO | WO99/64719 A2 | 12/1999 |
| WO | WO00/11313 A1 | 3/2000 |

OTHER PUBLICATIONS

RU 2038467 C1—Description Of The Invention To Russian Federation Patent—English Abstract.

RU 2046933 C1—Description Of The Invention To Russian Federation Patent—English Abstract.

SU 1629504 A1—Description Of The Invention To The Inventors Certificate—English Abstract.

"Petroleum Engineer International Pipeline & Gas Journal" Magazine Translation on 'Oil Recovery Experiments With N2 and CO2' by Arthur V. Petersen, Senior Engineer, Chevron USA, Denver. Colorado.

EOR+CO2=A Gas-Processing Challenge by R.L. Schendel, Irvine, California, pp. 158, 163-166.

"Engine-Exhaust Gas Offers Alternative for EOR" by Robert J. Hlozek, Oil & Gas Journal, Apr. 1, 1985, pp. 75-78.

"Block 31 Miscible Flood Remains Strong" by W.B. Bleakley, Petroleum EngineerMagazine, Nov. 1982, pp. 84, 86, 90, 92.

"Handbook of a gas industry specialist" by M. Chugunov & A. Khomlich, Minsk, 1965 (4 pages total).

"Combustion, flames and explosions of gases" by B. Lewis & G. Elbe, 2nd Edition, Moscow, 1968.

"The basics of gaseous fuel combustion" A handbook by A.S. Iserlin, 2nd Edition, Leningrad, 1987.

Geology, Oil Recovery,Physics and Reservoir Hydrodynamics, vol. XXII, Kazan Tatarskoye Publishing House, 1973 (11 pages including English translation).

"Study of oil displacement with nitrogen on reservoir model at pressures up to 70 MPa" by Vakhitov G.G., Namiot A. Yu., Skripka V.G. et al, Jan. 1, 1985 (7 pages including English translation).

"Handbook on oil recovery" Edited by Gimatudinov Sh.K., Moscow, Nedra, 1974 (4 pages including English translation).

"Use of carbon dioxide in oil recovery" by Balint V., Ban A., Doleshal Sh. et al., Moscow, Nedra, 1977 (6 pages including English translation).

"New trends in use of hydrocarbon gas" by Aroutyunov A.I., Louzin V.I., Maximov V.P. et al., Ekonomika i organizatsiia promishlennogo proizvodstva, 1980, No. 10 (76) (17 pages including English translation).

"Recovery, transportation and subterranean storage of gas" by Korotayev Yu.P., Shirkovsky A.I., Moscow, Nedra, 1984 (4 pages including English translation).

"Internal combustion engines: Systems of piston type and combination type engines" by Yefimov S.I., Ivaschenko N.A., Ivin V.I. et al., Moscow, Mashinostroyeniye, 1985 (4 pages including English translation).

"Polytechnical dictionary" edited by: A.Yu. Ishlinsky, Moscow, Sovietskaya encyclopedia, 1989 (4 pages including English translation).

"Engine Exhaust Boosts Oil Recovery" by W. F. Barstow, Oil & Gas Journal, Mar. 26, 1973, pp. 78-80.

"Enhanced-Recovery Inert Gas Processes Compared" by Keith Wilson, Oil & Gas Journal, Jul. 31, 1978, pp. 162-164, 166, 171,172.

"Exhaust Gas Provides Alternative Gas Source for Cyclic EOR" by George P. Stoeppelwerth, Oil & Gas Journal, Apr. 26, 1993, pp. 68, 69.

"Glossary of Contemporary Engineering", Edited by J. D. Beadle, London, The Macsimillan Press Ltd, 1972, p. 26, p. 35.

"Oxford English Dictionary" prepared by J. A. Simpson and E. S. C. Weiner, Oxford, Clarendon Press, 1989, vol. 2, p. 881.

"Oxford English Dictionary" prepared by J. A. Simpson and E. S. C. Weiner, Oxford, Clarendon Press, 1989, vol. 7, p. 536.

* cited by examiner

METHOD AND SYSTEM FOR RECOVERY OF HYDROCARBONS FROM A HYDROCARBON-BEARING INFORMATION

FIELD OF THE INVENTION

The invention relates to oil and natural gas production and can be used for recovering hydrocarbons from hydrocarbon-bearing formations, for example, from oil-bearing formations, or, for example, from gas-condensate reservoirs, or natural gas reservoirs, wherein natural gas is wet gas.

BACKGROUND OF THE INVENTION

It is well known that injection of a mixture of steam and flue gas into a hydrocarbon-bearing formation is used for increasing the production of hydrocarbons. Also, injection of gases at high temperatures into the hydrocarbon-bearing formation is used for the same purpose. This technique is very well described in the following U.S. Pat. No. 4,546,829; U.S. Pat. No. 3,948,323; U.S. Pat. No. 3,993,135; U.S. Pat. No. 2,734,578. This technique of affecting the hydrocarbon fluid present in the formation is realized by using primarily heat energy. However, the energy produced during combustion of such expensive and critical commodities, as hydrocarbon fuel, natural gas, products of oil refinery and recovered oil, is consumed to heat up the formation fluid.

Inert gases, such as, nitrogen, carbon dioxide, power plant exhaust gases are injected into a hydrocarbon-bearing formation to increase recovery of hydrocarbons.

The U.S. Pat. No. 4,330,038 offers to employ wet oxidation of combustible materials, as a source of energy and of production of a gas, which is to be injected into the formation. However, a part of energy, produced by the process of combustible materials wet oxidation, is consumed to support the process of wet oxidation, and, also, steam is used to produce energy. Consequently, the equipment for energy production is rather large and heavy.

The U.S. Pat. No. 5,402,847 describes a method of recovering methane from a coal bed by internal combustion engine exhaust gas injection into the coal bed, where methane is used as at least a part of fuel for a gas turbine engine or a diesel engine, and, where the exhaust gas is the exhaust gas of the gas turbine engine or the diesel engine. The gas, produced by this method from the coal bed, is a mixture comprising methane and inert gas, the inert gas comprising the exhaust gas components. In connection with this, the methane needs to be separated from the produced gas, and this operation requires additional expenses.

The U.S. Pat. No. 5,133,406 describes methane recovery from a coal seam by injecting fuel cell power system exhaust into the coal seam. Fluids, comprising methane, produced from the coal seam are further utilized in a fuel cell power system, which is very costly.

Injection of inert gas (such as, carbon dioxide, nitrogen, exhaust gas, and the like) into a hydrocarbon-bearing formation to increase recovery of hydrocarbons is accompanied by a significant increase of an amount of the produced gaseous component of a hydrocarbon-containing fluid, which is recovered from the formation. An increase of a gas factor (the term "gas factor" is explained below) is caused by inert gas breakthrough into production wells and by an increase of an amount of produced gaseous hydrocarbons, due to the inert gas ability to extract a part of gaseous hydrocarbons from a hydrocarbon-containing fluid present in the formation. For example, an increase of a gas factor was achieved, when formation oil-containing fluid was affected upon by carbon dioxide, and it resulted in 30-35% increase of the produced gaseous hydrocarbons amount and, accordingly, the value of the gas factor increased. Said 30-35% increase of the value of the gas factor has been achieved, due to the ability of the carbon dioxide to extract gaseous hydrocarbons from oil-containing fluid. An amount of gaseous hydrocarbons extracted from heavy oil (said oil, after its separation from formation oil-containing fluid has been affected upon by carbon dioxide) may be equal to an amount of gaseous hydrocarbons, separated from the formation oil-containing fluid /see: Mirsayapova, L. I. Extraction of light hydrocarbons from degassed oil under effect of $CO_2$// Geology, oil recovery, physics and reservoir hydrodynamics/ Works TatNIPIneft. Kazan: Tatarskoye Publishing House, 1973, Vol. No. 22, p. 233, p. 236, p. 238; Vakhitov G. G., Namiot A. Yu., Skripka V. G. et al. Study of oil displacement with nitrogen on reservoir model at pressures up to 70 MPa. Neftianoye khozyastvo, 1985, No. 1, p. 37/. A considerably higher influence on the increase of the gas factor has the inert gas breakthrough into production wells. For example, the carbon dioxide concentration in the produced gaseous component (Schedel R. L in his article uses the term <<associated gas>>) can increase up to the levels of 90% after a period of 6 months of carbon dioxide injection. This means, that carbon dioxide breakthrough may result in increase of 5-10 times the volume of the produced gaseous component, containing up to 80-90% of carbon dioxide /see: Schedel R. L. $EOR+CO_2=A$ gas processing challenge. //Oil and Gas Journal, 1982, Vol. 80, N 43, Oct. 25, p. 158/.

Thus, inert gas injection into a hydrocarbon-bearing formation to increase recovery of hydrocarbons is inseparably connected with a significant increase of a hydrocarbon-containing fluid gaseous component production, and with an increase of an inert gas concentration in the produced gaseous component. Inert gas presence in the gaseous component worsens its quality, decreases a heating value of the gaseous component and an ability of the gaseous component to burn will deteriorate. Accordingly, using the gaseous component as gaseous fuel will be quite difficult.

A method for the production of pressurized nitrogen for injection application at high pressure is offered in the U.S. Pat. No. 4,895,710. Natural gas is combusted in air, the air is compressed prior to combustion. Carbon dioxide is removed from flue gas, and the remaining nitrogen is used for injection. Heat energy, produced during the natural gas combustion, is transformed into mechanical energy. The compression of the air prior to combustion was offered so as to reduce the equipment's mass. The produced nitrogen is offered to be used preferably for injecting into oil and natural gas formations. However, this method does not provide for the effective utilization of the produced gaseous component of a hydrocarbon-containing fluid, where the gaseous component is a mixture, comprising natural gas (for example, associated gas) and the injection nitrogen.

The article /Hlozek R. J. "Engine-Exhaust Gas Offers Alternative for EOR," Oil and Gas Journal, Apr. 1, 1985, p.p. 75-78/describes exhaust gas injection into an oil-bearing formation. The exhaust gas production is described as the process of methane combustion in gas engines. Produced fluid is separated into oil and a gaseous component (the term "produced gas" is used in the article). Depending on the stage of the project's development, the gaseous component is injected into the formation and/or is sold as fuel gas. Also, natural gas liquids may be recovered from the gaseous component. However, there is no mentioning in the article about which methods and technical means would be employed to combust the gaseous component, which is sold as fuel gas. Together with this, the author declares, that when heating value of the produced gaseous fluid becomes lower than 950 BTU/cu ft (35,4×10$^6$ Joule/m$^3$), nitrogen and carbon dioxide are removed from the gaseous component. This conditions the necessity of the nitrogen and carbon dioxide removal practically during the whole process of the project, which will require additional expenses for purchasing and maintenance of the necessary equipment.

W. B. Bleakley in his article describes, that flue gas is injected into an oil-bearing formation. A gaseous component (the author uses the term "gas stream") of produced oil-containing fluid is separated from the fluid. The gaseous component is mixed with ethane and propane to increase heating value and then to be combusted in steam boilers, wherein the flue gas is produced. /Bleakley W. B., "Block 31 Miscible Flood Remains Strong," Petroleum Engineer International, November, 1982, p.p. 84, 86, 90, 92/. The use of this technique requires the combustion of combustible substances with high heating value, which are quite expensive.

In the U.S. Pat. No. 1,729,300 it has been offered recovering an oil-containing fluid through at least one production well, separating a gaseous component of the fluid from the fluid in a separator and producing steam in a power plant. A part of steam is injected into the formation by an injection device (which is represented by a pump with a steam converter). Another part of steam is used to produce energy. A part of the heat energy produced in the power plant is consumed to increase oil recovery.

In the U.S. Pat. No. 4,007,786 the secondary oil recovery and fuel gas production by employing a fuel generator is described. A part of energy produced when combusting the fuel gas with air, is transformed into mechanical energy and/or electrical energy, and heat energy of exhaust gas is used to produce steam, which is injected into the formation. However, a part of the energy is consumed to produce the fuel gas in the fuel gas generator, and a part of energy is consumed to produce the steam injected into the formation, which leads to the increase of the energy consumption.

As it is described in RU Pat. No. 2,038,467, a gaseous component (the term "associated gas" is used) of an oil-containing fluid is separated from the fluid, recovered from an oil-bearing formation through at least one production well. The gaseous component is combusted with oxygen in a power plant and the produced exhaust gas, is injected into the formation.

As it is described in the U.S. Pat. No. 4,344,486, a mixture comprising hydrocarbon, hydrogen sulfide and carbon dioxide is combusted with an oxygen enriched gas to produce heat energy, and to produce a concentrated carbon dioxide stream, which is to be injected into a hydrocarbon-bearing formation, so as to increase the recovery of liquid hydrocarbons.

Methods and equipment, offered in the U.S. Pat. No. 4,344,486 and the RU Pat. No. 2,038,467, allow to produce heat energy and to quite simply realize the separation, because a gaseous component separated from a hydrocarbon-containing fluid may comprise any hydrocarbon in gaseous state. However, a volume of the gas, produced from the combustion of the gaseous component in oxygen, is approximately equal to a volume of the gaseous component. That is why, it is necessary to additionally supply gas from exterior sources for the injection into the formation. Also, oxygen (or the oxygen enriched gas) is quite expensive, and the production of the oxygen, (or, the oxygen enriched gas) is connected with the extra energy losses.

It is an object of this invention to provide a method and system for recovery of hydrocarbons from a hydrocarbon-bearing formation, wherein, the disadvantages and deficiencies of known methods and systems for recovery of hydrocarbons are overcome.

Another object of this invention is to provide a method and a system for recovery of hydrocarbons by means of gas injection into a hydrocarbon-bearing formation, wherein, an improved production of gas, to be used for injection into the formation, is realized, and wherein expensive separation equipment is not required.

It is still another object of this invention to provide a method and a system for recovery of hydrocarbons by means of gas injection into a hydrocarbon-bearing formation, wherein the method and the system are environmentally safer and energy efficient.

And, it is still another object of this invention to provide a method and a system for recovery of hydrocarbons by means of gas injection into a hydrocarbon-bearing formation, wherein, economical and energy efficient utilization of a gaseous component of a hydrocarbon-containing fluid, recovered from a hydrocarbon-bearing formation, is employed.

These and other objects and advantages of the present invention will undoubtedly become apparent to those skilled in the art from the following description, figures and claims.

The following terms, as used in the description and claims of the present invention, shall have the following meaning.

The term "hydrocarbon-containing fluid" is herein used to denote a fluid comprising any liquid and any gas, which comprises at least one gaseous hydrocarbon and from about 0 to about 90 mole percent of inert gas. A hydrocarbon-containing fluid may comprise solid particles. Oil, gas-condensate, water and the like, and also, their mixtures may be examples of a liquid contained in a hydrocarbon-containing fluid. Any gaseous hydrocarbon (for example, such as, methane, ethane, propane, propylene, butane or the like) or a mixture of gaseous hydrocarbons may be contained in a hydrocarbon-containing fluid. A hydrocarbon-containing fluid is recovered from a hydrocarbon-bearing formation. For example, a hydrocarbon-containing fluid may be recovered from an oil-bearing formation, or for example, from a gas-condensate reservoir, or from a natural gas reservoir, or the like.

The term "gaseous component of a hydrocarbon-containing fluid" or the term "gaseous component" is used to denote a component of a hydrocarbon-containing fluid, which said component comprises at least one gaseous hydrocarbon (for example, such as, methane, ethane, propane, butane or the like), and, from about 0 to about 90 mole percent of inert gas (for example, such as, carbon dioxide, nitrogen, exhaust gas or a mixture of carbon dioxide and nitrogen). A gaseous component of a hydrocarbon-containing fluid may be separated from the fluid and may comprise sulphur-containing substances, vapor, solid particles and other substances.

The term "liquid component of a hydrocarbon-containing fluid" is used to denote a component of a hydrocarbon-containing fluid, which said component comprises at least one liquid, for example, any liquid hydrocarbon, water and the like. Also, oil, gas-condensate, a mixture of oil and water, and, the like may be examples of a liquid contained in a liquid component of a hydrocarbon-containing fluid. A liquid component of a hydrocarbon-containing fluid may be separated from the fluid.

The term "air" is used to denote atmospheric air, or a similar gaseous mixture, for example, a gaseous mixture comprising between about 20 and 25 volume percent of oxygen, and between about 75 and 80 volume percent of nitrogen. In addition to free oxygen and nitrogen, this gaseous mixture may comprise water vapor, inert gas (for example, such as, argon and carbon dioxide) and others constituents, which are the like of constituents atmospheric air.

The term "inert gas" is herein used to denote any gas, which is not able to promote and to support combustion. Examples of inert gases include carbon dioxide, nitrogen, exhaust gas, argon, and the like, and, also, mixtures of these gases. "Inert gas" is preferably used to denote any gas selected from the group consisting of carbon dioxide, nitrogen, exhaust gas, and a mixture of carbon dioxide and nitrogen.

The term "exhaust gas" is used to denote a gaseous mixture, which results from combustion of a gaseous fuel with an oxidant. An oxidant may consist of air. An exhaust gas, resulting from combustion of a gaseous fuel with air, comprises nitrogen and carbon dioxide, if the gaseous fuel comprises at least one hydrocarbon. In addition to carbon dioxide and nitrogen, an exhaust gas may comprise oxygen, nitrogen oxides, water vapor, mechanical contaminants and other constituents.

The term "gas factor" is the ratio of a volume of produced gas to a volume of produced liquid hydrocarbons (for example, such as, oil, or gas-condensate, or the like), both are determined under standard conditions.

The term "power plant" is used to denote: 1) any device capable of generating energy by combusting a fuel, for example, such as, an internal combustion engine; or 2) an equipment combination capable of generating energy by combusting a fuel. For example, mechanical, or electrical, or heat energy, or any combination thereof, may be generated in a power plant by combusting a fuel.

The term "gas engine" is used to denote an internal combustion engine, which is capable of operating by combusting a gaseous fuel with air. Preferably the term "gas engine" is used to denote any internal combustion engine of piston type, which is capable of operating by combusting gaseous fuel with air. A spark-ignition engine capable of operating on gaseous fuel may be an example of a gas engine, and which, for example, may be a four-stroke, or a two-stroke type. Also, an example of such engine may be the Wankel engine, adapted to operate on gaseous fuel. The term "gas engine" is not used to denote a gas turbine engine. The term "gas engine" is not used to denote a gas-diesel engine.

The term "gas turbine engine" is used to denote an internal combustion engine comprising a gas turbine, which is capable to be driven by the expanding products of combustion of a gaseous fuel with air.

The term "gas-diesel engine" is used to denote an internal combustion engine which is capable of operating by combusting a gaseous fuel with air, but with injection of a small portion of liquid fuel to promote ignition only.

Also, we shall denote the following properties of gaseous hydrocarbons:
volume heating value of gaseous hydrocarbons, when they are being compressed, increases practically in proportion with pressure /see: Chugunov M., Khomich A. Handbook of a gas industry specialist. Transportation and use of natural liquefied gases., Minsk, Nauka I Technika, 1965, p. 23/. The term "volume heating value", as used herein, shall denote heat amount value divided by fuel volume value, wherein the heat amount is produced from the complete combustion of the fuel;
increase of pressure of a hydrocarbon-air mixture widens its limits of flammability. For example, natural gas and atmospheric air mixture limits of flammability widen approximately twice as much, when pressure is increased from 0.1 MPa to 1 MPa /see: Lewis B., Elbe G. Combustion, flames and explosions of gases.— Moscow: Mir, 1968, p. 575/;
the gaseous hydrocarbons combustion reaction rate is in proportion with pressure /see: Isserlin A. S. The basics of gaseous fuel combustion. Leningrad: Nedra, 1987, p. 64/. That is, when the pressure is increased, burning rate of fuel, comprising gaseous hydrocarbons, increases and, accordingly, an amount of the fuel that may be combusted per time unit is increased also.

SUMMARY OF THE INVENTION

The objects of this invention can be attained by a method and system for recovery of hydrocarbons from a hydrocarbon-bearing formation.

The first aspect of the invention is a method of recovering hydrocarbons from a hydrocarbon-bearing formation, the method comprising: recovering a hydrocarbon-containing fluid from the formation through at least one production well; separating a gaseous component of the fluid from the fluid; mixing air and at least a part of the gaseous component and compressing a gas-air mixture resulting from said mixing, so as to produce a flammable and pressurized gas-air mixture; combusting said at least a part of the gaseous component with said air in a power plant, from which an exhaust gas resulting from said combustion is discharged; injecting a gas, comprising at least a part of the exhaust gas, into the formation through at least one injection well; and wherein said compression is performed prior to said combustion.

The second aspect of the invention is a method of recovering hydrocarbons from a hydrocarbon-bearing formation, the method comprising: recovering a hydrocarbon-containing fluid from the formation through at least one production well; separating a gaseous component of the fluid from the fluid; compressing and then mixing air and at least a part of the gaseous component, so as to produce a flammable and pressurized gas-air mixture; combusting said at least a part of the gaseous component with said air in a power plant, from which an exhaust gas resulting from said combustion is discharged; injecting a gas, comprising at least a part of the exhaust gas, into the formation through at least one injection well; and wherein said mixing is performed prior to said combustion.

In accordance with the third aspect of the invention there is provided a system for recovery of hydrocarbons by means of gas injection into a hydrocarbon-bearing formation penetrated by at least one injection well, and, by at least one production well which contains means for separating a gaseous component of a hydrocarbon-containing fluid from the fluid, the system comprising: a power plant comprising an internal combustion engine for utilizing at least a part of the gaseous component as a gaseous fuel for said engine, wherein said engine is adapted to operate by combusting the gaseous fuel with air and adapted to discharge an exhaust gas resulting from said combustion, and wherein said engine is adapted to produce a flammable and pressurized gas-air mixture comprising said at least a part of the gaseous component and air; and means for injecting a gas, comprising at least a part of the exhaust gas, into the formation through said injection well.

In accordance with the fourth aspect of the invention there is provided a system for recovery of hydrocarbons by means of gas injection into a hydrocarbon-bearing formation penetrated by at least one injection well, and, by at least one production well which is in fluid communication with a separator, said separator being adapted to separate a gaseous component of a hydrocarbon-containing fluid from the fluid, the system comprising: a power plant comprising an internal combustion engine for utilizing at least a part of the gaseous component as a gaseous fuel for said engine, wherein said engine is adapted to operate by combusting the gaseous fuel with air and adapted to discharge an exhaust gas resulting from said combustion, and wherein said engine is adapted to produce a flammable and pressurized gas-air mixture comprising said at least a part of the gaseous component and air; and means for injecting a gas, comprising at least a part of the exhaust gas, into the formation through said injection well.

In accordance with the fifth aspect of the invention there is provided a system for recovery of hydrocarbons by means of gas injection into a hydrocarbon-bearing formation penetrated by at least one injection well, and, by at least one production well which contains means for separating a gaseous component of a hydrocarbon-containing fluid from the fluid, the system comprising: a power plant which comprises an engine selected from the group consisting of a gas engine, a gas turbine engine and a gas-diesel engine, said selected engine being adapted to utilize at least a part of the gaseous component as gaseous fuel and adapted to discharge an exhaust gas resulting from combustion of said at least a part of the gaseous component in said selected engine; and means for injecting a gas, comprising at least a part of the exhaust gas, into the formation through said injection well.

In accordance with the sixth aspect of the invention there is provided a system for recovery of hydrocarbons by means of gas injection into a hydrocarbon-bearing formation penetrated by at least one injection well, and, by at least one production well which is in fluid communication with a separator, said separator being adapted to separate a gaseous component of a hydrocarbon-containing fluid from the fluid, the system comprising: a power plant which comprises an engine selected from the group consisting of a gas engine, a gas turbine engine and a gas-diesel engine, said selected engine being adapted to utilize at least a part of the gaseous component as gaseous fuel and adapted to discharge an exhaust gas resulting from combustion of said at least a part of the gaseous component in said selected engine; and means for injecting a gas, comprising at least a part of the exhaust gas, into the formation through said injection well.

Injection of an inert gas, such as, a gas, comprising an exhaust gas, into a hydrocarbon-bearing formation results in increase of liquid hydrocarbons recovery, and is accompanied by a significant increase of production of a gaseous component of a hydrocarbon-containing fluid. An increase of a gas factor is caused by inert gas breakthrough into production wells and by an increase of an amount of produced gaseous hydrocarbons, due to the inert gas ability to extract a part of gaseous hydrocarbons from a hydrocarbon-containing fluid present in the formation. However, the inert gas breakthrough into the production wells leads to a significant increase of the inert gas concentration in the produced gaseous component. Accordingly, a quality and a heating value of the produced gaseous component will decrease, and the ability of the produced gaseous component to burn will deteriorate.

In the present invention, a gaseous component of produced hydrocarbon-containing fluid is separated from said fluid; air and the gaseous component are mixed and a gas-air mixture resulting from said mixing is compressed (alternatively, said air and the gaseous component are compressed and then mixed), so as to produce a flammable and pressurized gas-air mixture prior to combustion in a power plant. This ensures widening limits of flammability, increasing volume heating value and burning rate of the gaseous component, and allows to realize effective combustion of the gaseous component with said air in the power plant even with significant concentration of inert gas in the gaseous component. This, accordingly, allows to produce necessary amount of an exhaust gas for injection into a hydrocarbon-bearing formation for increasing liquid hydrocarbons recovery, and to generate energy, and provides a possibility for a power plant to operate effectively with high energy characteristics. And, increase of the gas factor, caused by increase of an amount of produced gaseous hydrocarbons, demonstrates, that the gaseous hydrocarbons production growth is realized more intensively, than the liquid hydrocarbons production growth. That is why, the energy production may increase more intensively (and, also, the exhaust gas production for injection), than the liquid hydrocarbons recovery. Accordingly, the amount of energy, received from exterior producers, to realize the hydrocarbons production may be decreased.

BRIEF DESCRIPTION OF THE DRAWINGS

The actual construction, operation, and apparent advantages of the present invention will be better understood by referring to the drawings which do not demonstrate all the embodiments of the present invention and, which are not necessarily to scale and in which like numerals refer to like parts and in which.

DESCRIPTION OF THE PREFERRED EMBODIMENTS

Figure 1:
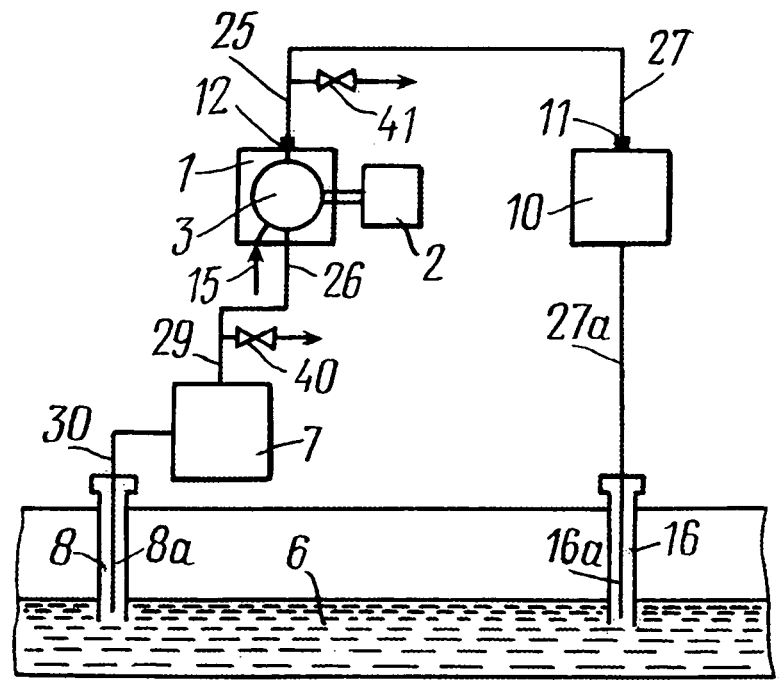
FIG. 1 schematically illustrates an embodiment of the system of the present invention, in which a gaseous component of a hydrocarbon-containing fluid is separated from the fluid in a separator.

The present invention is susceptible of embodiment in many different forms. Certain embodiments of the present invention will herein be discussed in detail. However, the present description is to be considered an exemplification of the principles of the invention and is not intended to limit the invention to the embodiments illustrated. In the discussion of the Figures, the same numbers will be used to refer to the same or similar components throughout the description.

According to the present invention a hydrocarbon-containing fluid is recovered from a hydrocarbon-bearing formation through at least one production well. A gaseous component of the fluid is separated from the fluid. At least a part of the gaseous component is combusted with air in a power plant, from which an exhaust gas resulting from said combustion is discharged. A gas, comprising at least a part of the exhaust gas, is injected into the formation through at least one injection well. Said air and said at least a part of the gaseous component are mixed and a gas-air mixture resulting from said mixing is compressed, so as to produce a flammable and pressurized gas-air mixture prior to said combustion. Alternatively, said air and said at least a part of the gaseous component are compressed and then are mixed, so as to produce a flammable and pressurized gas-air mixture prior to said combustion.

Said mixing and said compression may be realized in the power plant or in other devices, which are not contained in the power plant. Pressure of the flammable and pressurized gas-air mixture may be maintained in accordance with the composition of said at least a part of the gaseous component, for example, depending on the detonation characteristic of said at least a part of the gaseous component to be used as gaseous fuel. The gas-air mixture and/or said at least a part of the gaseous component, may be heated, for example, so as to avoid moisture condensation during said compression.

A part of the exhaust gas may be added into the gas-air mixture prior to said combustion (or into said at least a part of the gaseous component and/or into said air prior to said mixing), so as, for example, to maintain the desirable combustion mode in the power plant (for example, when the said at least a part of the gaseous component composition is changed), to achieve the exhaust gas desirable composition, and, to enhance the detonation characteristic of said at least a part of the gaseous component, which is to be utilized as gaseous fuel in the power plant.

Energy is generated in the power plant, when said combustion of said at least a part of the gaseous component with said air is realized. The energy generated in the power plant is at least one selected from the group consisting of mechanical energy, electrical energy and heat energy. The exhaust gas, resulting from said combustion, is discharged from the power plant. The exhaust gas comprises nitrogen and carbon dioxide, which together make up for a major part of the exhaust gas. For example, the carbon dioxide and nitrogen concentration in dry exhaust gas may be more than 90%, when atmospheric air is used as oxidant in a combustion process in power plants.

It is known, that gas, such as, an exhaust gas of a power plant is injected into a hydrocarbon-bearing formation to increase hydrocarbons recovery. The gas injection may be realized using means for injecting a gas, comprising at least a part of the exhaust gas, into the formation through at least one injection well penetrating the formation. Said means for injecting a gas may include, for example, a tubing string, and/or an annular space of the well, or the like, and, for example, means for receiving said at least a part of the exhaust gas from the power plant. Said means for injecting a gas may comprise a device for creating gas pressure, for example, a compressor, or a pump or the like. For example, when the formation is an oil-bearing formation, the gas comprising at least a part of the exhaust gas may be injected, for example, into a gas cap, or an aqueous portion of the formation, or depleted portion of the formation, or into a selected for injection oil-bearing portion of the formation or the like.

The present invention will be better understood after we resort to the embodiments of the system illustrated in FIG. 1, FIG. 2, FIG. 3, FIG. 4, FIG. 5, FIG. 6.

In FIG. 1 schematically shown are a hydrocarbon-bearing formation 6 penetrated by a production well 8 and by an injection well 16; a separator 7 being in fluid communication with the production well 8 through a line 30; the separator 7 being adapted to separate a gaseous component of a hydrocarbon-containing fluid from said fluid; a power plant 1, comprising an internal combustion engine 3; the power plant 1 is in fluid communication with the separator 7 through lines 29 and 26; a device 2 is selected from the group consisting of an electric generator, a compressor and a pump; an injection unit 10; the power plant 1 has an exhaust gas outlet 12, which is in fluid communication with an inlet 11 of the injection unit 10 through lines 25 and 27; the injection unit 10 is in fluid communication with the injection well 16 through a line 27a.

The engine 3 is adapted to operate by combusting a gaseous fuel with air, and adapted to discharge an exhaust gas resulting from said combustion. Accordingly, the design of the internal combustion engine 3 includes the design elements to carry out operation of the internal combustion engine 3 by means of combusting a gaseous fuel with air. The gaseous fuel may comprise, for example, at least one gaseous combustible substance selected from a group consisting of methane, ethane, propane, butane, natural gas. In addition to at least one combustible substance the gaseous fuel may comprise at least one non-combustible substance, for example, inert gas, water vapor and the like. Ordinary gaseous fuel comprises a small quantity of non-combustible substances. The gaseous component separated from the hydrocarbon-containing fluid comprises at least one gaseous hydrocarbon (for example, such as, methane, ethane, propane, butane or the like) and from about 0 to about 90 mole percent of inert gas, for example, such as, nitrogen, carbon dioxide, a mixture of nitrogen and carbon dioxide. The engine 3 is adapted to produce a flammable and pressurized gas-air mixture, comprising at least a part of the gaseous component and air, so as to be able to utilize said at least a part of the gaseous component as said gaseous fuel and to use said air as oxidant in a combustion process.

In the operation of the system shown in FIG. 1, a hydrocarbon-containing fluid is recovered from the hydrocarbon-bearing formation 6 through the production well 8. The production well 8 includes a tubing string 8a. Said fluid passes from the production well 8 through the line 30 into the separator 7, in which a gaseous component of said fluid is separated from said fluid.

After being separated from said fluid, the gaseous component passes from the separator 7 into the line 29. At least a part of the gaseous component passes from the line 29 through the line 26 into the power plant 1. If there is an excessive amount of the gaseous component in the line 29, other equipment (for example, processing equipment) may be connected to the line 29 through a valve 40.

Air is directed into the power plant 1 through a line 15. Said at least a part of the gaseous component is combusted with said air in the engine 3, in which a flammable and pressurized gas-air mixture, comprising said at least a part of the gaseous component and said air, is produced prior to said combustion in the combustion chamber of the engine 3. Mechanical energy is produced by the engine 3, when said at least a part of the gaseous component is combusted with said air. The engine 3 may be selected from a group consisting of a gas engine, a gas turbine engine and a gas-diesel engine.

For example, said at least a part of the gaseous component and said air are mixed and a gas-air mixture resulting from said mixing is compressed, so as to produce the flammable and pressurized gas-air mixture prior to said combustion, if said combustion of said at least a part of the gaseous component with said air is realized, for example, in the gas engine (for example, a piston-type gas engine, such as, a spark-ignition engine, adapted to operate on gaseous fuel) or, for example, in the gas-diesel engine. For example, the design of said spark-ignition engine may provide for carrying out said mixing in a mixer, and, for carrying out said compression of the gas-air mixture in cylinders, where ignition by a spark takes place after the compression stroke or at the end of the compression stroke. In each cylinder a piston is capable of performing reciprocating motion. The expanding combustion products make the piston move, thus generating mechanical energy. We shall make a note, that said at least a part of the gaseous component and said air may be compressed prior to said mixing to enhance the forming of the gas-air mixture.

For example, said at least a part of the gaseous component and said air are compressed in compressors and then are mixed (in a mixer), so as to produce the flammable and pressurized gas-air mixture prior to said combustion, if said combustion of said at least a part of the gaseous component with said air is realized in the gas turbine engine, which includes said compressors and said mixer.

Depending on the composition of the flammable and pressurized gas-air mixture and the type of the power plant 1, said combustion is started after said compression, or during said compression. We will keep in mind, that the gas-air mixture may be flammable prior to compression (it depends on the known conditions, for example, on the inert gas concentration in said at least a part of the gaseous component; a ratio between said air, contained in the gas-air mixture, and said at least a part of the gaseous component, contained in the gas-air mixture; a temperature; a pressure, and the like). However, even in this case, said compression of the gas-air mixture prior to said combustion produces a positive effect, because volume heating value and burning rate of said at least a part of the gaseous component increase after said compression. An ignition moment may be selected in different ways. For example, in the gas engine, having spark-ignition system, timing of ignition of a flammable and pressurized gas-air mixture is determined by setting a corresponding meaning of spark ignition advance. For example, ignition of a flammable and pressurized gas-air mixture may be realized by injecting other combustible substances into it (for example, in the gas-diesel engine, when the compression stroke approaches its end, a small quantity of liquid fuel may be injected into the flammable and pressurized gas-air mixture to ignite it).

Depending on the composition of the flammable and pressurized gas-air mixture and the type of the power plant 1, a ratio between the amount of said air and the amount of said at least a part of the gaseous component, which are contained in the gas-air mixture (just like in the flammable and pressurized gas-air mixture), may be maintained so, that the gas-air mixture may comprise said air in the amount, which is theoretically necessary for oxidizing combustible constituents of said at least a part of the gaseous component. Or the gas-air mixture may comprise more of said air, than it is theoretically necessary for oxidizing the combustible constituents of said at least a part of the gaseous component (for example, to ensure the complete combustion of the combustible constituents of said at least a part of the gaseous component). Alternatively, the gas-air mixture may comprise less of said air, than it is theoretically necessary for oxidizing the combustible constituents of said at least a part of the gaseous component, when it is necessary to achieve lower oxygen ratio in the products of said combustion. However, it may become more preferable, when the ratio between said air and said at least a part of the gaseous component is maintained so, that the gas-air mixture comprises no more of said air than it is necessary for oxidizing the combustible constituents of said at least a part of the gaseous component.

An exhaust gas, resulting from said combustion of said at least a part of the gaseous component with said air in the engine 3, comprises carbon dioxide and nitrogen. The exhaust gas is discharged from the engine 3 through the exhaust gas outlet 12 into the line 25. A valve 41 is used for letting off the excessive amount of the exhaust gas from the line 25, if it becomes necessary. At least a part of the exhaust gas passes from the line 25 through the line 27 and an inlet 11 into the injection unit 10 for injecting into the formation 6 through the injection well 16 to increase the recovery of hydrocarbons from the formation 6. A gas, comprising said at least a part of the exhaust gas, passes from the injection unit 10 through the line 27a and the injection well 16 into the formation 6.

The injection unit 10 and the injection well 16 are adapted to inject a gas, comprising at least a part of the exhaust gas, into the formation 6. The injection of the gas, comprising at least a part of the exhaust gas, is realized through the injection well 16, for example, using a tubing string 16a or an annular space of the injection well 16.

The engine 3 may be adapted for driving the device 2, which may be the electric generator, or the pump, or the compressor. For example, if the device 2 is the electric generator, then the electrical energy generated by the electric generator is used to supply oilfield equipment, and may be generated into an electrical network. For example, if the device 2 is the pump, then it may be adapted to inject water into the formation 6 through at least one injection well (not shown). Different designs of the power plant 1 and the device 2 are possible. For example, the power plant 1 may comprise the internal combustion engine 3 and the electric generator driven by the internal combustion engine 3. For example, the power plant 1 and the compressor (or, the pump) may be connected together and positioned as one unit, or installation, or the like.

Figure 2:
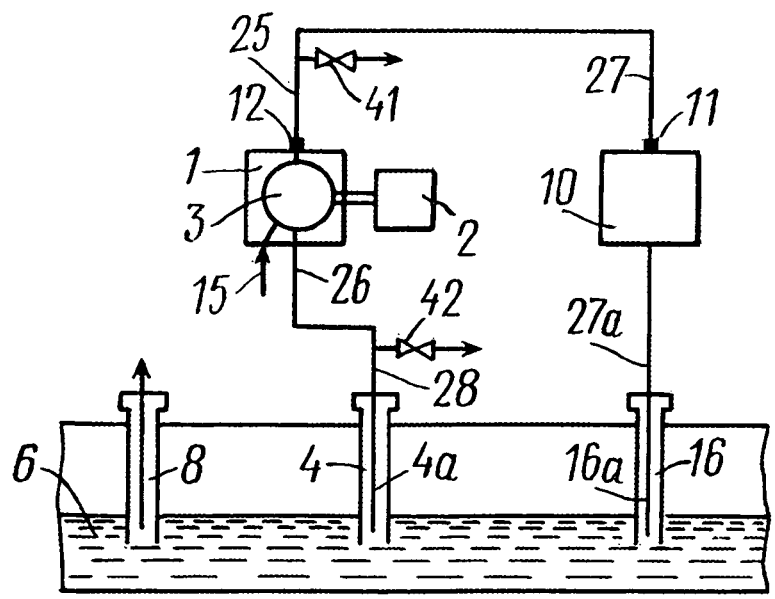
FIG. 2 schematically illustrates an alternative embodiment of the system of the present invention, in which there is a production well containing means for separating a gaseous component of a hydrocarbon-containing fluid from the fluid.

In FIG. 2 schematically shown is an embodiment of the system, which differs from the embodiment of the system shown in FIG. 1, the difference being that in the embodiment of the system, shown in FIG. 2, a gaseous component of a hydrocarbon-containing fluid is separated from said fluid in at least one production well.

In FIG. 2 schematically shown are the hydrocarbon-bearing formation 6 penetrated by a production well 4 which contains means for separating a gaseous component of a hydrocarbon-containing fluid from said fluid; the production well 8; the injection well 16; the power plant 1, comprising the internal combustion engine 3; the power plant 1 is in fluid communication through a line 28 and the line 26 with said gaseous component separation means; the device 2 is selected from a group consisting of the electric generator, the compressor and the pump; and the injection unit 10.

The production well 4 is one of possible modifications of a production well. The production well 4 is adapted to include said gaseous component separation means, for example, such as a separator adapted for positioning within the well, or a gas anchor of a sucker-rod pump, or an annular space of the well, or a combination thereof; or, for example, such as, tubing string 4a, adapted for recovering a hydrocarbon-containing fluid gaseous component in the form of dry gas from a gas cap (when the formation 6 is an oil-bearing formation which comprises the gas cap containing the dry gas).

In the operation of the system shown in FIG. 2, a hydrocarbon-containing fluid is recovered from the formation 6 through the production well 4, or through the production wells 4 and 8. A gaseous component of said fluid is separated from said fluid in the production well 4. After being separated from said fluid, the gaseous component passes from the production well 4 into the line 28. At least a part of the gaseous component passes from the line 28 through the line 26 into the power plant 1. If there is an excessive amount of the gaseous component in the line 28, other equipment (for example, processing equipment) may be connected to the line 28 through a valve 42.

The power plant 1, the engine 3, the device 2, the injection unit 10, the injection well 16 and their operation are described in the description of the embodiment schematically shown in FIG. 1.

Figure 3:
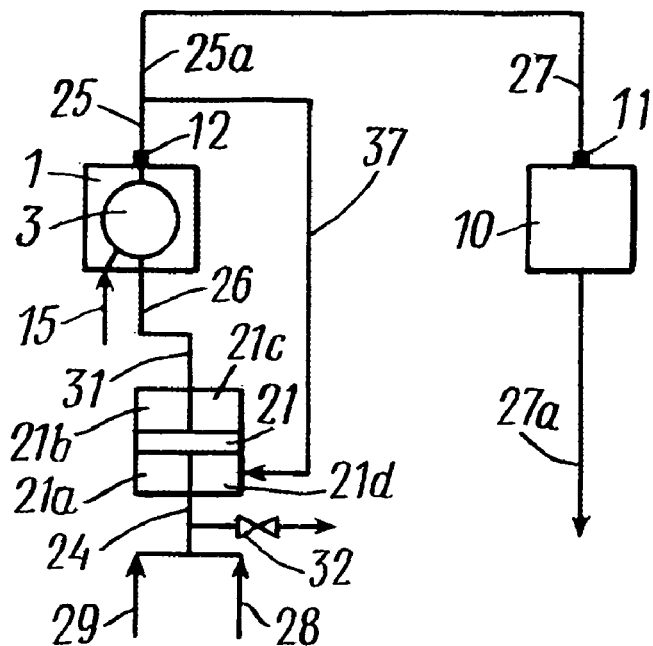
FIG. 3 schematically illustrates an alternative embodiment of the system of the present invention, in which a gaseous component of a hydrocarbon-containing fluid is being treated prior to combustion in a power plant.

Treatment of at least a part of a gaseous component of a hydrocarbon-containing fluid may be done after separating of the gaseous component from said fluid prior to combusting said at least a part of the gaseous component in the power plant 1. Referring to FIG. 3. In FIG. 3 schematically shown are a preparation unit 21, which comprises a corrosive substances removal unit 21a, a heavy hydrocarbons removal unit 21b, a heating unit 21c, an exhaust gas adding unit 21d, the exhaust gas adding unit 21d being in fluid communication with the exhaust gas outlet 12 of the power plant 1 through the line 25 and a line 37; the preparation unit 21 being in fluid communication through a line 24 with the line 28 or the line 29; the preparation unit 21 being in fluid communication with the power plant 1 through a line 31 and the line 26; the exhaust gas outlet 12 of the power plant 1 is in fluid communication with the inlet 11 of the injection unit 10 through the line 25, a line 25a and the line 27.

In the operation of the system shown in FIG. 3, a gaseous component of a hydrocarbon-containing fluid after separating from said fluid in the separator 7 (shown in FIG. 1) passes through the line 29 into the line 24. Alternatively, a gaseous component of a hydrocarbon-containing fluid after separating from said fluid in the production well 4 (shown in FIG. 2) passes through the line 28 into the line 24. At least a part of the gaseous component is passed from the line 24 into the preparation unit 21. If there is an excessive amount of the gaseous component in the line 24, other equipment (for example, processing equipment) may be connected to the line 24 through a valve 32.

Said at least a part of the gaseous component is prepared in the preparation unit 21. For preparation and treatment of said at least a part of the gaseous component and/or the gas-air mixture, the preparation unit 21 or the power plant 1 may comprise: means for removing corrosive substances, or moisture, or both from said at least a part of the gaseous component; means for removing heavy hydrocarbons from said at least a part of the gaseous component; means for heating said at least a part of the gaseous component, or the gas-air mixture, or both; means for adding a part of the exhaust gas into said at least a part of the gaseous component, or into the gas-air mixture, or into both; means for removing solid particles from said at least a part of the gaseous component.

Removing of corrosive substances (for example, sulphur containing substances), or moisture, or both from said at least a part of the gaseous component is realized by said corrosive substances removal means, for example, such as, the corrosive substances removal unit 21a, where, for example, processes employing the use of tertiary amines may be applied for removing the corrosive substances, and where, for example, solid desiccants, glycol and the like may be used for removing the moisture.

Removing of heavy hydrocarbons (which may be present in said at least a part of the gaseous component) from said at least a part of the gaseous component is realized by said heavy hydrocarbons removal means, for example, such as, the heavy hydrocarbons removal unit 21b, wherein, for example, said at least a part of the gaseous component may be chilled to remove heavy hydrocarbons (such as, butane, pentane and heavier hydrocarbons).

Heating of said at least a part of the gaseous component is realized by said heating means, for example, such as, the heating unit 21c. Heating is done, for example, so as to speed up chemical reactions during the system operation, or, for example, to avoid liquid vapor condensation, for example, water vapor. Said at least a part of the gaseous component may be heated, when the heating unit 21c is a part of the preparation unit 21. When the heating unit 21c is positioned within the power plant 1 (such positioning of the heating unit 21c is not shown in the FIG. 3), the gas-air mixture comprising said at least a part of the gaseous component and said air, may be heated.

The exhaust gas adding unit 21d allows to realize the following. The exhaust gas discharged from the power plant 1 through the exhaust gas outlet 12 into the line 25 is distributed between the line 25a and the line 37. A part of the exhaust gas (usually a lesser part of the exhaust gas) passes from the line 25 through the line 37 into the exhaust gas adding unit 21d, wherein the part of the exhaust gas is added (for example, by way of mixing) into said at least a part of the gaseous component. The concentration of moisture, corrosive substances and solid particles may be decreased in the part of the exhaust gas prior to its entering the exhaust gas adding unit 21d. Another part of the exhaust gas (usually a major part of the exhaust gas) passes from the line 25 through the line 25a, the line 27 and the inlet 11 into the injection unit 10 for injecting into the formation 6 through the injection well 16 (shown in FIG. 1 and FIG. 2).

When the exhaust gas adding unit 21d is positioned within the power plant 1 (such positioning of the exhaust gas adding unit 21d is not shown in FIG. 3), the part of the exhaust gas may be added into said at least a part of the gaseous component and/or into air, which is to be used as oxidant in the combustion process of said at least a part of the gaseous component in the power plant 1. Or, the part of the exhaust gas may be added into the gas-air mixture, which comprises said at least a part of the gaseous component and said air. Thus, the exhaust gas adding unit 21d allows to realize recirculation of the part of the exhaust gas. The exhaust gas adding unit 21d is one of possible embodiments of said means for adding a part of the exhaust gas into said at least a part of the gaseous component, or into the gas-air mixture, or into both. Adding of an exhaust gas, comprising nitrogen and carbon dioxide, into the gas-air mixture composition, may be realized, for example, so as to maintain the desirable combustion mode in the power plant 1 (for example, when the said at least a part of the gaseous component composition is changed), to achieve the exhaust gas desirable composition and, to enhance the detonation characteristic of said at least a part of the gaseous component, which is to be utilized as gaseous fuel in the power plant 1.

Said at least a part of the gaseous component after being prepared and treated in the preparation unit 21 passes from the unit 21 through a line 31 and the line 26 into the power plant 1. The power plant 1 and the injection unit 10 and their operation are described in the description of the embodiment schematically shown in FIG. 1.

Figure 4:
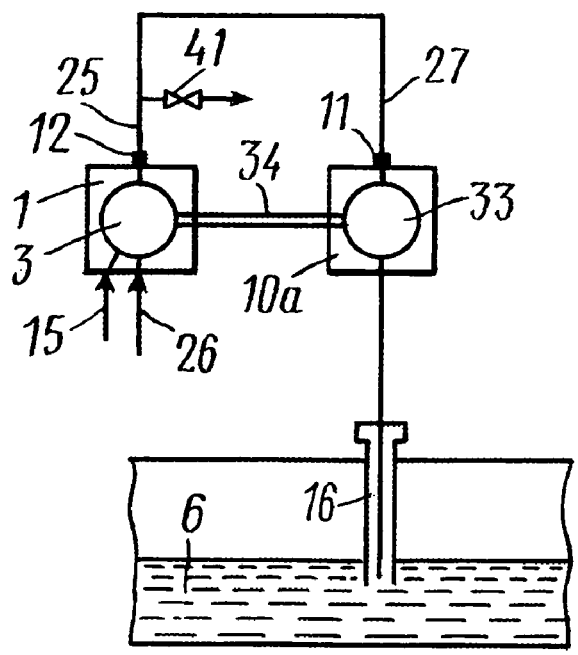
FIG. 4 schematically illustrates an embodiment of an injection unit.

The injection unit 10 may comprise a compressor. Referring to FIG. 4. In FIG. 4 schematically shown are an injection unit 10a; the injection well 16; the power plant 1; the injection unit 10a comprises a compressor 33 driven by the internal combustion engine 3; and the internal combustion engine 3 being connected with the compressor 33 using mechanical drive means 34, for example, such as, shafts, connecting sleeves, flange couplings, tooth gears, and the like.

The injection unit 10a is one of possible embodiments of the injection unit 10. In the operation of the injection unit 10a shown in FIG. 4, the exhaust gas, discharged from the power plant 1 through the exhaust gas outlet 12, passes into the line 25. At least a part of the exhaust gas passes from the line 25 through the line 27 and the inlet 11 into the injection unit 10a. A gas comprising said at least a part of the exhaust gas is fed under pressure into the injection well 16 by the injection unit 10a, which is capable to create sufficient pressure for injecting the gas into the formation 6. The injection unit 10a comprises the compressor 33 to create sufficient pressure for injecting the gas, comprising said at least a part of the exhaust gas, into the formation 6 through the injection well 16.

Different designs of the power plant 1 and the injection unit 10a are possible, for example, the compressor 33 and the power plant 1 may be connected together and positioned as one unit, or installation, or the like.

An exhaust gas may comprise moisture and/or corrosive substances, and the moisture and/or corrosive substances concentration may exceed allowable meanings. Treatment of at least a part of the exhaust gas for the purpose of removing the moisture, or corrosive substances, or both is realized using means for purifying the exhaust gas from the moisture, or the corrosive substances, or both.

Figure 5:
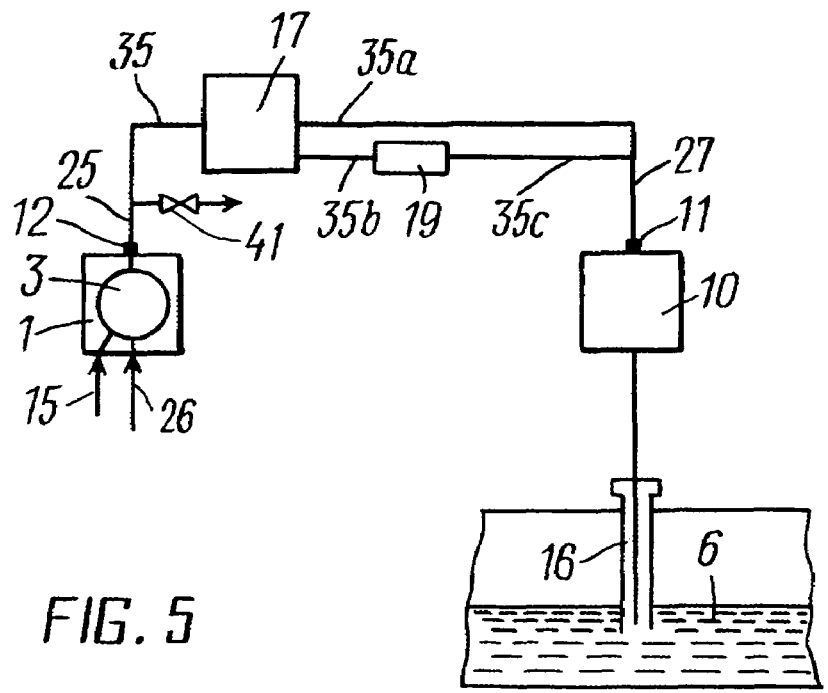
FIG. 5 schematically illustrates an alternative embodiment of the system of the present invention, in which the purification of an exhaust gas of a power plant takes place.

Referring to FIG. 5. In FIG. 5 schematically shown are: an exhaust gas purification unit 17 being in fluid communication with the exhaust gas outlet 12 through the line 25 and a line 35; the exhaust gas purification unit 17 being in fluid communication with the inlet 11 of the injection unit 10 through a line 35a and the line 27; a gas separation unit 19 being in fluid communication with the exhaust gas purification unit 17 through a line 35b; the gas separation unit 19 being in fluid communication with the inlet 11 of the injection unit 10 through a line 35c and the line 27; the power plant 1 and the injection well 16.

In the operation of the system shown in FIG. 5, the exhaust gas, discharged from the power plant 1 through the exhaust gas outlet 12, passes into the line 25. At least a part of the exhaust gas passes from the line 25 through the line 35 into the exhaust gas purification unit 17, wherein said at least a part of the exhaust gas is treated for removal of corrosive substances (such as, oxygen, nitrogen oxides and some other), or moisture, or both. In the exhaust gas purification unit 17, oxygen content in said at least a part of the exhaust gas may be reduced by using, for example, catalytic combustion or membrane separators. In the exhaust gas purification unit 17, for example, catalytic converters may be employed to reduce nitrogen oxides concentration. In the exhaust gas purification unit 17 said at least a part of the exhaust gas may be cooled down to remove moisture, and, if it is necessary, solid desiccants, glycol and the like are used for this purpose. Also, the exhaust gas purification unit 17 may be used for solid particles removal from said at least a part of the exhaust gas. The exhaust gas purification unit 17 is one of possible embodiments of said exhaust gas purification means. Said at least a part of the exhaust gas, purified in the exhaust gas purification unit 17, passes from the exhaust gas purification unit 17 through the line 35a, the line 27 and the inlet 11 into the injection unit 10 for injecting into the formation 6 through the injection well 16.

Alternatively, prior to injection said at least a part of the exhaust gas may be directed from the exhaust gas purification unit 17 through the line 35b into the exhaust gas separation unit 19. Depending on the geological-physical characteristic of the hydrocarbon-bearing formation 6 and its development stage the composition of said at least a part of the exhaust gas may be treated to the desired level in the exhaust gas separation unit 19, by, for example, reducing the concentration of nitrogen in said at least a part of the exhaust gas, or by adding other substances. Said at least a part of the exhaust gas passes from the exhaust gas separation unit 19 through the line 35c, the line 27 and the inlet 11 into the injection unit 10 for injecting into the formation 6 through the injection well 16.

The power plant exhaust gas temperature may be equal to about 350-400° C. The exhaust gas heat may be utilized. Power plants may have cooling systems and cooling system heat of the power plants may be also utilized.

Figure 6:
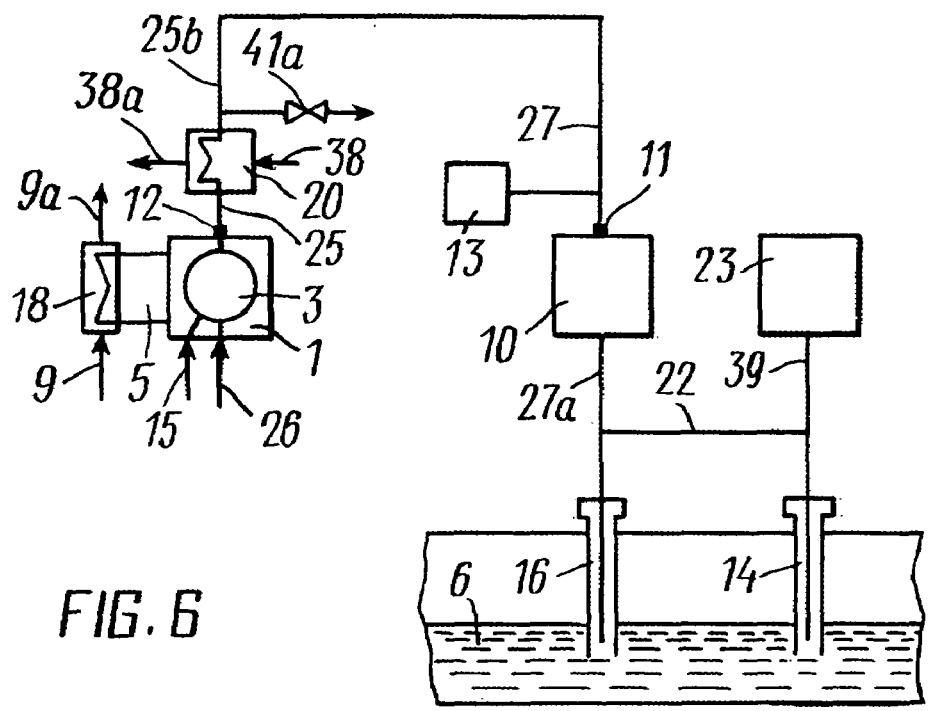
FIG. 6 schematically illustrates an alternative embodiment of the system of the present invention, wherein exhaust gas heat and cooling system heat of a power plant are utilized.

Referring to FIG. 6. In FIG. 6 schematically shown are: the power plant 1 having a cooling system 5 with a heat exchanger 18, a waste-heat boiler 20 being in fluid communication with the exhaust gas outlet 12 through the line 25; the waste-heat boiler 20 being in fluid communication with the inlet 11 of the injection unit 10 through a line 25b and the line 27; the injection well 16.

To illustrate additional possibilities connected with the present invention, in FIG. 6 schematically shown are: an injection well 14 penetrating the formation 6, a gas-holder 13, a pump 23 for injecting water into the formation 6 through the injection well 14.

The waste-heat boiler 20 and/or the heat exchanger 18 may be used for heating such heat carriers, as, for example, water and/or gas comprising at least a part of the exhaust gas prior to its injection into the formation 6. The heating of the gas comprising said at least a part of the exhaust gas may be done to prevent formation of hydrates, or, for example, to increase effectiveness of viscous oil production. A heat carrier is directed through a line 38 into the waste-heat boiler 20 to be heated and after being heated exits the waste-heat boiler 20 through a line 38a. A heat carrier is directed into the heat exchanger 18 to be heated through a line 9 and after being heated exits the heat exchanger 18 through a line 9a.

The gas-holder 13 may be used to supply to the inlet 11 of the injection unit 10 the necessary amount of gas to be injected into the formation 6. For example, the gas-holder 13 is used to store the excess of the exhaust gas, when an excessive amount of the exhaust gas is produced. When it is not enough of the gas to be injected into the formation 6, a part of the gas is directed from the gas-holder 13 to the inlet 11 of the injection unit 10 to be injected into the formation 6.

In the operation of the system shown in FIG. 6, the exhaust gas, discharged from the power plant 1 through the exhaust gas outlet 12, passes through the line 25 into the waste-heat boiler 20, in which, the exhaust gas heat is transferred to other heat carriers (for example, water and/or injection gas), and the exhaust gas is cooled down. When the exhaust gas temperature is reduced, moisture, present in the exhaust gas is condensed and moisture concentration in the exhaust gas is reduced. The exhaust gas passes from the waste-heat boiler 20 into the line 25b. A valve 41a is used for letting off the excessive amount of the exhaust gas from the line 25*b*, if it becomes necessary. At least a part of the exhaust gas passes from the line 25*b* through the line 27 and the inlet 11 into the injection unit 10 for injecting into the formation 6 through the injection well 16.

Water may be injected into the formation 6 through the injection well 14. The water passes from the pump 23 through a line 39 and the injection well 14 into the formation 6. The water may be heated in the heat exchanger 18 and/or in the waste-heat boiler 20 prior to injection (not shown). Said at least a part of the exhaust gas passes from the injection unit 10 through the line 27*a*, a line 22 and the injection well 14 into the formation 6, when the gas comprising said at least a part of the exhaust gas is not injected through the injection well 16. The gas comprising said at least a part of the exhaust gas and the water may be injected into the formation 6 through the injection well 14 simultaneously (for example, when mixing the water with said at least a part of the exhaust gas in the injection well 14), as well, as one after another. Accordingly, when only the water is injected into the formation 6 through the injection well 14, then, the gas comprising said at least a part of the exhaust gas is injected into the formation 6 through the injection well 16.

The main meaning of the present invention is in the following. Injection of an inert gas, such as, a gas, comprising an exhaust gas, into a hydrocarbon-bearing formation results in increase of liquid hydrocarbons recovery (for example, oil recovery, or recovery of gas-condensate), and is accompanied by a significant increase of production of a gaseous component of a hydrocarbon-containing fluid. An increase of a gas factor is caused by inert gas breakthrough into production wells and by an increase of an amount of produced gaseous hydrocarbons, due to the inert gas ability to extract a part of gaseous hydrocarbons from a hydrocarbon-containing fluid present in the formation. However, the inert gas breakthrough into the production wells leads to a significant increase of the inert gas concentration in the produced gaseous component. The produced gaseous component comprises gaseous hydrocarbons and from about 0 (that is, from practically meaningless value) to 90 mole percent of nitrogen and/or carbon dioxide, which are the exhaust gas constituents. Nitrogen and/or carbon dioxide concentration may be about 0% at the beginning of the gas injection. The nitrogen and/or carbon dioxide concentration may reach almost 90% after the inert gas breakthrough into the production well (or, the production wells). Accordingly, the quality and the heating value of the produced gaseous component will decrease because of considerable nitrogen and carbon dioxide presence, and the produced gaseous component ability to burn will deteriorate.

In the present invention, a hydrocarbon-containing fluid comprising, for example, gas, oil (or gas-condensate) and water, is recovered from a hydrocarbon-bearing formation; a gaseous component of the fluid is separated from the fluid; air and the gaseous component are mixed and a gas-air mixture resulting from said mixing is compressed (alternatively, said air and the gaseous component are compressed and then mixed), so as to produce a flammable and pressurized gas-air mixture prior to combustion in a power plant. This ensures widening limits of flammability, increasing volume heating value and burning rate of the gaseous component. For example, upper limit and lower limit of flammability of a gas-air mixture, consisting of atmospheric air and gaseous fuel, will be respectively equal to about 56% and about 19% (as far as, the combustible constituent is concerned, the respective values will be about 11.2% and about 3.8%), when the gas-air mixture pressure is equal to about 0.8 MPa and the gaseous fuel consists of 20% of natural gas and 80% of inert gas (said inert gas contains 90% of nitrogen and 10% of carbon dioxide). For example, upper limit and lower limit of flammability of a gas-air mixture, consisting of atmospheric air and gaseous fuel, will be respectively equal to about 79% and about 32% (as far as, the combustible constituent is concerned, the respective values will be about 7.9% and about 3.2%), when the gas-air mixture pressure is equal to about 1,6 MPa and the gaseous fuel consists of 10% of natural gas and 90% of inert gas (said inert gas contains 90% of nitrogen and 10% of carbon dioxide). The calculations were done using following works: /see: Lewis B., Elbe G. Combustion, flames and explosions of gases.—Moscow: Mir, 1968, p. 575; Isserlin A. S. The basics of gaseous fuel combustion. Leningrad: Nedra, 1987, p. 69/. Thus, the above shown examples demonstrate, that, in spite of the inert gas high concentration in the gaseous fuel, combustion of the gaseous fuel with atmospheric air is ensured, and, wherein, also, the volume heating value and the burning rate increase approximately in proportion with pressure.

Due to widening the limits of flammability, increasing the volume heating value and the burning rate of the gaseous component, effective combustion of the gaseous component with said air in the power plant is realized even with significant concentration of inert gas in the gaseous component. This, accordingly, allows to produce necessary amount of exhaust gas for injection into a hydrocarbon-bearing formation for increasing liquid hydrocarbons recovery, and to generate energy, and provides a possibility for a power plant to operate effectively with high energy characteristics. And, increase of the gas factor, caused by increase of an amount of produced gaseous hydrocarbons, demonstrates, that the gaseous hydrocarbons production growth is realized more intensively, than the liquid hydrocarbons production growth. That is why, the energy production may increase more intensively (and, also, the exhaust gas production for injection), than the liquid hydrocarbons recovery. Accordingly, the amount of energy, received from exterior producers, to realize the hydrocarbons production may be decreased. The present invention may become useful when recovering oil, gas-condensate and natural gas comprising natural gas liquids. Also, the present invention may be successfully applied when recovering natural gas from depleted natural gas reservoirs.

Example: electrical energy consumed to realize oil recovery from an oil-bearing formation through production wells, and, other technological processes performed at an oil-field (without considering the electrical energy consumed to realize gas injection) is equal to approximately 192 kWh per one ton of produced oil. A hydrocarbon-containing fluid comprising a liquid (for example, oil or, such as, oil and water) and a gaseous component is recovered from the oil-bearing formation. The gaseous component of the produced hydrocarbon-containing fluid is separated from said fluid. Said gaseous component is combusted with atmospheric air in 10 power plants. Every power plant contains a gas engine driving an electric generator. The pressure of a flammable and pressurized gas-air mixture in the gas engine combustion chamber is equal to about 1 MPa prior to said combustion. At least a part of an exhaust gas resulting from said combustion is injected by a compressor through injection wells into the formation. The compressor is driven by an electric motor. The electrical energy consumed to realize the exhaust gas injection required to produce 1 ton of oil is equal to about 135 kWh. In the beginning of the exhaust gas injection, a gas factor is equal to about 75 m³/t and oil production is equal to about 960 t/day.

In the beginning of the exhaust gas injection, said gaseous component is supplied into every power plant in the amount of 300 m³/h. In the beginning of the exhaust gas injection, gaseous hydrocarbons constitute approximately 100% of said gaseous component (that is, said gaseous component consists of natural gas), and, the lower heating value of said gaseous component equals to about $Q_H \cong 39.5 \times 10^6$ Joule/m³. When supplying 300 m³/h of said gaseous component into the power plant, useful power, given by the generator of the power plant to users, will be P≅987 kW; heat energy, given to heat carriers (for example, water) will be Q≅1.41×10⁹ cal/h. Wherein, nitrogen and carbon dioxide (contained as components of the exhaust gas of the power plant) are discharged from the power plant in the amount of $V_p \cong 2834$ m³/h (including, carbon dioxide more than 12%). Thus, with the given conditions—in the beginning of the exhaust gas injection, when 1 ton of oil is produced, approximately 246 kWh of electrical energy may be generated by the power plant (where said gaseous component is utilized as gaseous fuel). Accordingly, the specific energy consumption (here, "energy" is the energy received from exterior producers) to realize the oil recovery and other technological processes performed at an oil-field will be not more than 81 kWh per 1 ton of produced oil.

The injection of the exhaust gas, containing nitrogen and carbon dioxide, resulted in the daily oil production increase by 10%. The supply of said gaseous component into the power plant will also increase. This is interrelated with the increase in oil production, and is caused by the increase of the gas factor, said gas factor increase is realized due to exhaust gas breakthrough into the production wells and the ability of the exhaust gas to extract gaseous hydrocarbons from the oil-containing fluid present in the formation. After the exhaust gas breakthrough said gaseous component comprises about 50% of gaseous hydrocarbons and about 50% of inert gas, which consists of 90% of nitrogen and 10% of carbon dioxide. Said gaseous component is supplied into the power plant in the amount of about 720 m³/h. The lower heating value of said gaseous component is about $Q^H \cong 19.75 \times 10^6$ Joule/m³ (when pressure is equal 0.1 MPa). The lower heating value of said gaseous component is about $Q_H \cong 197.5 \times 10^6$ Joule/m³ (when pressure is equal 1 MPa). The upper limit and the lower limit of flammability of the gas-air mixture (when pressure is equal 1 MPa), consisting of said gaseous component and atmospheric air, will be respectively about 37.4% and about 8.61% (as far as, the combustible constituent is concerned, the respective values will be about 18.7% and about 4.305%). When supplying said volume of said gaseous component with said composition into the power plant, the useful power, given by the generator of the power plant to users, will be P≅1185 kW; heat energy, given to heat carriers (for example, water) will be Q≅1.69×10⁹ cal/h. Wherein, nitrogen and carbon dioxide (contained as components of the exhaust gas of the power plant) are discharged from the power plant in the amount of $V_p \cong 3760$ m³/h (including, carbon dioxide more than 12%). Thus, with the given conditions, when 1 ton of oil is produced, approximately 269 kWh of electrical energy may be generated by the power plant (where said gaseous component is utilized as gaseous fuel). Accordingly, the specific energy consumption (here, "energy" is the energy received from exterior producers) to realize the oil recovery and other technological processes performed at an oil-field will be not more than 58 kWh per 1 ton of recovered oil.

Also, the present invention will provide an environmentally safer hydrocarbons production process from a hydrocarbon-bearing formation due to carbon dioxide being injected into the formation instead of being released into the atmosphere.

What is claimed is:

1. A method of recovering hydrocarbons from a hydrocarbon-bearing formation, the method comprising:
    recovering a hydrocarbon-containing fluid from the formation through at least one production well;
    separating a gaseous component of the fluid from the fluid;
    combusting at least a part of the gaseous component with air in an internal combustion engine which is comprised in a power plant and adapted to operate by said combustion, wherein said air and said at least a part of the gaseous component are mixed and a gas-air mixture resulting from said mixing is compressed, so as to produce a flammable and pressurized gas-air mixture prior to said combustion, and wherein an exhaust gas resulting from said combustion is discharged from said internal combustion engine; and
    injecting a gas, comprising at least a part of the exhaust gas, into the formation through at least one injection well.

2. The method of claim 1, wherein energy is produced in the power plant, and wherein the energy is at least one selected from the group consisting of mechanical energy, electrical energy and heat energy.

3. The method of claim 1, wherein the exhaust gas comprises carbon dioxide and nitrogen.

4. The method of claim 1, wherein said gas, comprising at least a part of the exhaust gas, is treated for removal of moisture, or corrosive substances, or both, prior to said gas, comprising at least a part of the exhaust gas, being injected into the formation through said injection well.

5. The method of claim 1, wherein a part of the exhaust gas is added to said air, or to said at least a part of the gaseous component, or to both, prior to said air and said at least a part of the gaseous component being mixed.

6. The method of claim 1, wherein a part of the exhaust gas is added to the gas-air mixture prior to said combustion.

7. The method of claim 1, wherein a pressure of said flammable and pressurized gas-air mixture is at least about 1 MPa.

8. The method of claim 1, wherein the gas-air mixture or said at least a part of the gaseous component is heated prior to said compression.

9. The method of claim 1, wherein a ratio between said air, contained in the gas-air mixture, and said at least a part of the gaseous component, contained in the gas-air mixture, is maintained so, that the gas-air mixture comprises no more of said air than it is necessary for oxidizing combustible constituents of said at least a part of the gaseous component.

10. The method of claim 1, wherein heavy hydrocarbons are removed from said at least a part of the gaseous component prior to said mixing.

11. The method of claim 1, wherein said at least a part of the gaseous component is treated for removal of moisture, or corrosive substances, or both, prior to said mixing.

12. The method of claim 1, wherein said combustion is combustion of said at least a part of the gaseous component with said air without adding an additional combustible substance to the gas-air mixture, or to said at least a part of the gaseous component, or to both.

13. The method of claim 1, wherein said combustion is combustion of said at least a part of the gaseous component with said air without removal of an inert gas from said at least a part of the gaseous component prior to the combustion.

14. The method of claim 1, wherein said combustion is combustion of said at least a part of the gaseous component with said air without adding oxygen to the gas-air mixture, or to said air, or to both.

15. A method of recovering hydrocarbons from a hydrocarbon-bearing formation, the method comprising:
  recovering a hydrocarbon-containing fluid from the formation through at least one production well;
  separating a gaseous component of the fluid from the fluid;
  combusting at least a part of the gaseous component with air in an internal combustion engine which is comprised in a power plant and adapted to operate by said combustion, wherein said air and said at least a part of the gaseous component are compressed and then are mixed, so as to produce a flammable and pressurized gas-air mixture prior to said combustion, and wherein an exhaust gas resulting from said combustion is discharged from said internal combustion engine; and
  injecting a gas, comprising at least a part of the exhaust gas, into the formation through at least one injection well.

16. The method of claim 15, wherein energy is produced in the power plant, and wherein the energy is at least one selected from the group consisting of mechanical energy, electrical energy and heat energy.

17. The method of claim 15, wherein the exhaust gas comprises carbon dioxide and nitrogen.

18. The method of claim 15, wherein said gas, comprising at least a part of the exhaust gas, is treated for removal of moisture, or corrosive substances, or both, prior to said gas, comprising at least a part of the exhaust gas, being injected into the formation through said injection well.

19. The method of claim 15, wherein a part of the exhaust gas is added to said at least a part of the gaseous component, or to said flammable and pressurized gas-air mixture, or to both, prior to said combustion.

20. The method of claim 15, wherein a pressure of said flammable and pressurized gas-air mixture is at least about 1 MPa.

21. The method of claim 15, wherein a ratio between said air, contained in said flammable and pressurized gas-air mixture, and said at least a part of the gaseous component, contained in said flammable and pressurized gas-air mixture, is maintained so, that said flammable and pressurized gas-air mixture comprises no more of said air than it is necessary for oxidizing combustible constituents of said at least a part of the gaseous component.

22. The method of claim 15, wherein heavy hydrocarbons are removed from said at least a part of the gaseous component prior to said mixing.

23. The method of claim 15, wherein said at least a part of the gaseous component is treated for removal of moisture, or corrosive substances, or both, prior to said compression.

24. A system for recovery of hydrocarbons from a hydrocarbon-bearing formation penetrated by at least one injection well, and, by at least one production well which contains means for separating a gaseous component of a hydrocarbon-containing fluid from the fluid, the system comprising:
  a power plant which comprises an internal combustion engine adapted to operate by combusting at least a part of the gaseous component with air, wherein said internal combustion engine is adapted to discharge an exhaust gas resulting from said combustion and adapted to produce a flammable and pressurized gas-air mixture comprising said at least a part of the gaseous component and said air, and wherein said internal combustion engine is adapted to produce said flammable and pressurized gas-air mixture prior to said combustion; and
  means for injecting a gas, comprising at least a part of the exhaust gas, into the formation through said injection well.

25. The system of claim 24 further comprising:
  a device selected from the group consisting of a pump, an electric generator and a compressor, said internal combustion engine being adapted for driving the selected device.

26. The system of claim 24, wherein said means for injecting a gas comprises a compressor adapted to be driven by said internal combustion engine.

27. The system of claim 24, wherein said internal combustion engine is one selected from the group consisting of a gas engine, a gas turbine engine and a gas-diesel engine.

28. The system of claim 24 further comprising: means for adding a part of the exhaust gas into said flammable and pressurized gas-air mixture, or into said at least a part of the gaseous component, or into both.

29. The system of claim 24 further comprising:
  means for removing heavy hydrocarbons.

30. The system of claim 24 further comprising: means for heating said flammable and pressurized gas-air mixture, or said at least a part of the gaseous component, or both.

31. The system of claim 24 further comprising: a waste-heat boiler to utilize the exhaust gas heat.

32. The system of claim 24 further comprising: means for purifying the exhaust gas from moisture, or corrosive substances, or both.

33. The system of claim 24, wherein said internal combustion engine is an internal combustion engine adapted to operate by combusting said at least a part of the gaseous component with said air without removal of an inert gas from said at least a part of the gaseous component prior to said combustion.

34. The system of claim 24, wherein said internal combustion engine is an internal combustion engine adapted to operate by combusting said at least a part of the gaseous component with said air without adding an additional combustible substance to said flammable and pressurized gas-air mixture, or to said at least a part of the gaseous component, or to both.

35. The system of claim 24, wherein said internal combustion engine is an internal combustion engine adapted to operate by combusting said at least a part of the gaseous component with said air without adding oxygen to said flammable and pressurized gas-air mixture, or to said air, or to both.

36. A system for recovery of hydrocarbons from a hydrocarbon-bearing formation penetrated by at least one injection well, and, by at least one production well which is in fluid communication with a separator, said separator being adapted to separate a gaseous component of a hydrocarbon-containing fluid from the fluid, the system comprising:
  a power plant which comprises an internal combustion engine adapted to operate by combusting at least a part of the gaseous component with air, wherein said internal combustion engine is adapted to discharge an exhaust gas resulting from said combustion and adapted to produce a flammable and pressurized gas-air mixture comprising said at least a part of the gaseous component and said air, and wherein said internal combustion engine is adapted to produce said flammable and pressurized gas-air mixture prior to said combustion; and means for injecting a gas, comprising at least a part of the exhaust gas, into the formation through said injection well.

37. The system of claim 36 further comprising: a device selected from the group consisting of a pump, an electric generator and a compressor, said internal combustion engine being adapted for driving the selected device.

38. The system of claim 36, wherein said means for injecting a gas comprises a compressor adapted to be driven by said internal combustion engine.

39. The system of claim 36, wherein said internal combustion engine is one selected from the group consisting of a gas engine, a gas turbine engine and a gas-diesel engine.

40. The system of claim 36 further comprising: means for adding a part of the exhaust gas into said flammable and pressurized gas-air mixture, or into said at least a part of the gaseous component, or into both.

41. The system of claim 36 further comprising: means for removing heavy hydrocarbons.

42. The system of claim 36 further comprising: means for heating said flammable and pressurized gas-air mixture, or said at least a part of the gaseous component, or both.

43. The system of claim 36 further comprising: a waste-heat boiler to utilize the exhaust gas heat.

44. The system of claim 36 further comprising: means for purifying the exhaust gas from moisture, or corrosive substances, or both.

45. The system of claim 36, wherein said internal combustion engine is an internal combustion engine adapted to operate by combusting said at least a part of the gaseous component with said air without removal of an inert gas from said at least a part of the gaseous component prior to said combustion.

46. The system of claim 36, wherein said internal combustion engine is an internal combustion engine adapted to operate by combusting said at least a part of the gaseous component with said air without adding an additional combustible substance to said flammable and pressurized gas-air mixture, or to said at least a part of the gaseous component, or to both.

47. The system of claim 36, wherein said internal combustion engine is an internal combustion engine adapted to operate by combusting said at least a part of the gaseous component with said air without adding oxygen to said flammable and pressurized gas-air mixture, or to said air, or to both.

* * * * *

UNITED STATES PATENT AND TRADEMARK OFFICE
CERTIFICATE OF CORRECTION

| | | |
|---|---|---|
| PATENT NO. | : 7,299,868 B2 | Page 1 of 1 |
| APPLICATION NO. | : 10/471831 | |
| DATED | : November 27, 2007 | |
| INVENTOR(S) | : Alexei Leonidovich Zapadinski | |

It is certified that error appears in the above-identified patent and that said Letters Patent is hereby corrected as shown below:

Cover page and column 1, lines 1 - 3, replace TITLE as follows:
    replace: "METHOD AND SYSTEM FOR RECOVERY OF HYDROCARBONS FROM A HYDROCARBON-BEARING INFORMATION"
    with: -- METHOD AND SYSTEM FOR RECOVERY OF HYDROCARBONS FROM A HYDROCARBON-BEARING FORMATION --.

Column 3, line 4: replace "35,4" with -- 35.4 --.

Column 5, line 4: replace "others" with -- other --.

Column 5, line 5: replace "constituents atmospheric" with -- constituents of atmospheric --.

Column 18, line 10: replace "1,6" with -- 1.6 --.

Signed and Sealed this

Sixth Day of May, 2008

JON W. DUDAS
*Director of the United States Patent and Trademark Office*